(12) United States Patent
Fischer et al.

(10) Patent No.: US 8,270,541 B2
(45) Date of Patent: Sep. 18, 2012

(54) METHOD FOR RECOVERING A BIT STREAM FROM A RADIO SIGNAL

(75) Inventors: Georg Fischer, Nuremberg (DE); Frank Gerhard Ernst Obernosterer, Nuremberg (DE); Peter Christian Gunreben, Moehrendorf (DE)

(73) Assignee: Alcatel Lucent, Paris (FR)

( * ) Notice: Subject to any disclaimer, the term of this patent is extended or adjusted under 35 U.S.C. 154(b) by 724 days.

(21) Appl. No.: 12/273,907

(22) Filed: Nov. 19, 2008

(65) Prior Publication Data

US 2009/0135966 A1    May 28, 2009

(30) Foreign Application Priority Data

Nov. 19, 2007  (EP) .................................... 07022385

(51) Int. Cl.
*H04L 27/06*    (2006.01)
(52) U.S. Cl. ....................................................... 375/341
(58) Field of Classification Search .................. 375/316, 375/341, 340
See application file for complete search history.

(56) References Cited

U.S. PATENT DOCUMENTS

2006/0062322 A1*  3/2006  Namgoong et al. .......... 375/285
2006/0291599 A1* 12/2006  Strodtbeck et al. ........... 375/347

OTHER PUBLICATIONS

European Search Report.

* cited by examiner

*Primary Examiner* — Kevin M Burd
(74) *Attorney, Agent, or Firm* — Fay Sharpe LLP

(57) ABSTRACT

The invention relates to a method for recovering a bit stream from a radio signal (2, 3, 4) received in a first receiving station (S1) and at least one further receiving station (S2, S3), the method comprising the steps of: in each of the receiving stations (S1 to S3), demodulating the received radio signal (2, 3, 4) to form a demodulated data stream (B, B', B"), transferring the at least one demodulated data stream (B', B") from the at least one further receiving station (S2, S3) to the first receiving station (S1), in the first receiving station (S1), generating a combined data stream from the demodulated data streams (B, B', B") of each of the receiving stations (S1 to S3), and performing a hard decision on the combined data stream for recovering the bit stream.

10 Claims, 3 Drawing Sheets

METHOD FOR RECOVERING A BIT STREAM FROM A RADIO SIGNAL

BACKGROUND OF THE INVENTION

The invention relates to a method for recovering a bit stream from a radio signal received in a first receiving station and in at least one further receiving station, to a receiving station for recovering a bit stream from a radio signal received in the receiving station and at least one further receiving station, to a base station router comprising at least one such receiving station and a channel element, and to a network for recovering a bit stream from a radio signal.

When a radio signal emitted by a mobile station is received in two or more different receiving stations, it is possible to combine the received signals in such a way that the bit stream which has been emitted by the mobile station can be recovered with a higher quality as compared to the case that the reconstruction is performed based on a single received signal. For recovering such a bit stream by combining two or more received signals, two schemes known as softer handover and soft handover are known in the state of the art, which will be briefly explained in the following with respect to FIGS. 1 and 2.

Figure 1:
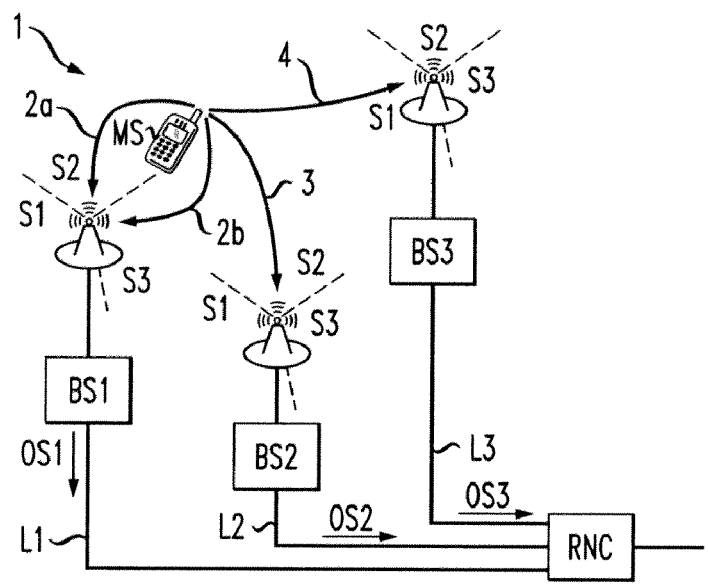

FIG. 1 shows an example of a hierarchical wireless network 1 with a Radio Network Controller RNC as a central station which is connected to three base stations BS1 to BS3 located at different sites within the network 1. Each of the base stations BS1 to BS3 comprises three sectors, also referred to as receiving stations S1 to S3 in the following, for receiving radio signals which have been emitted by a mobile station MS, e.g. a mobile phone, PDA etc. In the example of FIG. 1, the radio transmission between the base stations BS1 to BS3 and the mobile station MS is implemented using the UMTS (universal mobile telecommunications system) standard, based on a 16-QAM (quadrature amplitude modulation) modulation scheme, using an in-phase (I) and a quadrature-phase (Q) component for encoding the bit stream. For this reason, radio signals transmitted in the network are also referred to as IQ baseband signals in the following.

Radio signals emitted by the mobile station MS are received by each of the three base stations BS1 to BS3. In the first base station BS1, a first and second receiving station S1, S2 receive respective radio signals 2a, 2b from the mobile station MS, whereas in the second and third base station BS2, BS3, only the second and first receiving stations S2, S1, respectively, are capable of receiving radio signals 3, 4 from the mobile station MS.

For recovering a bit stream from the radio signals 2a, 2b received by the first and second receiving stations S1, S2 of the first base station BS1, these signals are combined in a process which is referred to as softer handover (HO). In softer handover, the radio signals 2a, 2b of the two receiving stations S1, S2 (including their diversity branches) are combined using Maximum Ratio Combining (MRC) which is known as the optimum linear combining scheme of signals with noise, typically producing an output signal OS1 of the first base station BS1 with improved quality as compared to bit streams of the output signals OS2, OS3 from the second and third base station BS2, BS3.

Figure 2:
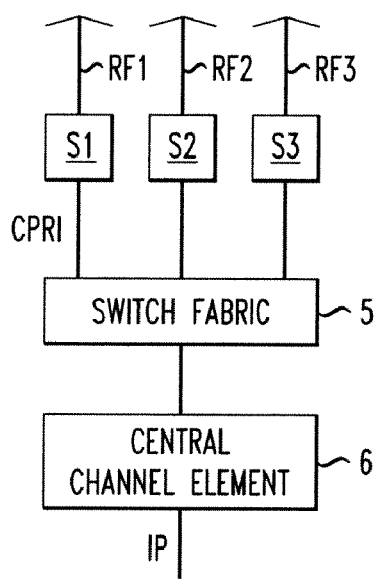

However, for applying the softer handover scheme, a lot of data needs to be routed between the receiving stations S1 to S3 of the first base station BS1, being a base station according to the CPRI/OBSAI (Common Packet Radio Interface/Open Base Station Architecture Initiative) standard shown in greater detail in FIG. 2, each of the three receiving stations S1 to S3 of which are connected to a respective radio frequency (RF) head RF1 to RF3. Of course, two or more radio heads may also be used for each of the receiving stations S1 to S3 when diversity receiving is performed.

The three receiving stations S1 to S3 are connected to a specialized switch fabric 5 to which the received radio signals 2a, 2b are transported according to the CPRI protocol standard, using a huge amount of IQ baseband data, thus requiring a backplane with huge data transport capacity. This is especially problematic if the receiving stations S1 to S3 and their respective RF heads RF1 to RF3 are installed remotely and the CPRI data has to be transported over larger distances in the context of a so-called base station hotel concept. Furthermore, the switch fabric 5 has to support tremendous data rates.

The concept described above is furthermore not easily scalable if more and more receiving stations are to be added with upgrades, as the switch fabric has to be adapted in this case. The same problem occurs with a central channel element 6 after the switch fabric 5 which transforms the CPRI data to IP data at its output. The size of the channel element 6 has to match the final number of receiving stations, such that a "pay as you grow" strategy is not supported with the CPRI/OBSAI approach.

In summary, the backplane of a base station has to offer a tremendous bandwidth in order to support softer handover. As any combination of received signals from multiple receiving stations is possible and as base stations with three sectors and diversity receiving (e.g. using two RF heads per receiving station) are typical, the bandwidth equals six times the bandwidth of the basic IQ baseband data signal. For example, the IQ baseband data may be sampled as 2×14 bit at two samples per chip for UMTS which equals 2×14×2×3.84 MChip/s=215 Mbit/s. Inside the radio cards, an adaptive scaling is performed reducing the resolution from 14 to 5 bit, leading to 76.8 Mbit/s. Considering the six antenna paths arising from three receiving stations plus receiving diversity this implies a total bandwidth of 76.8×6=460.1 Mbit/s, requiring an extremely costly backplane.

For combining the output signals OS1 to OS3 of the three base stations BS1 to BS3, another scheme called soft handover is used which applies a "frame selection" in the radio network controller RNC, to which the output signals OS1 to OS3 are routed as IP data via respective links L1 to L3.

The frame selection is based on decoded frames of the output signals OS1 to OS3 from the base stations BS1 to BS3. During the frame selection, valid frames are selected from the frames in the output signals OS1 to OS3 by evaluating the CRC (cyclic redundancy check) checksums, in particular the indicator bit transported with each frame, indicating a good or bad frame. Frame selection is not able to truly combine the information of the different output signals OS1 to OS3. Thus, soft handover is a kind of hard decision and may be seen as some sort of selection combining inside the radio network controller RNC, which serves as a concentrator function.

The soft handover scheme used today catches a certain amount of combining gain, but not all. It would be desirable to have also softer handover combining between different base stations, but due to enormous bandwidth requirements in the backhaul, this is not feasible. Using softer handover between the base stations would require to send IQ baseband data received in multiple receiving stations towards the radio network controller RNC. It would also imply that the concentrator function, which today is a simple frame selection task, would become very computationally intense, especially in light that a radio network controller RNC has to handle a few hundred base stations. When performing softer handover, the radio network controller RNC would have to perform digital signal processing tasks and not a simple selection and switching task as today. The radio network controller RNC would also have to be equipped with high performance signal processing DSPs and ASICs for this purpose.

Moreover, in the context of a flat IP network structure, where all network elements are collapsed into Base Station Routers (BSR), there is no longer a central station such as a radio network controller. However, also in a flat IP network, it is still desirable to offer soft or softer handover.

SUMMARY OF THE INVENTION

A method is provided for recovering a bit stream from a radio signal received in a first receiving station and in at least one further receiving station, the method comprising the steps of: in each of the receiving stations, demodulating the received radio signal to form a demodulated data stream, transferring the at least one demodulated data stream from the at least one further receiving station to the first receiving station, in the first receiving station, generating a combined data stream from the demodulated data streams of each of the receiving stations, and performing a hard decision on the combined data stream for recovering the bit stream.

Examples of embodiments of the invention advantageously provide: a method, a receiving station, a base station router, as well as a network, all of which allowing for recovering a bit stream with high quality from a radio signal by combining at least two received radio signals while keeping the transport capacity required for the combining of the radio signals at a comparatively low level.

The invention proposes to transfer the demodulated data stream, thus requiring a considerably lower transport capacity as compared to a softer handover which requires to transport the entire IQ baseband signal. In contrast to the soft handover, the hard decision is only made after the transfer, such that combining the demodulated data streams to generate a combined data signal with improved quality is possible, instead of selecting one of the plurality of decided bit sequences by using the frame selection process described above. As one of the receiving stations—typically the one which has set up the call for the mobile station—performs the combining of the demodulated data streams no additional network element such as a radio network controller is required, such that the proposed solution is ideally suited for non-hierarchical networks.

Therefore, by making use of the invention, it is possible to profit from softer handover in every case, whether a mobile station is served by several receiving stations of one base station or by receiving stations of different base stations, without running into problems of huge data transport requirements. The architecture of the corresponding network becomes more flat, the different handling of soft and softer handover is avoided, as all the links are "softer".

Consequently, the transport capacity required for the scheme proposed above lies in-between the two extremes of transport capacity defined by the soft and softer handover schemes: Considering the example of a 384 kbit/s service for the mobile user, soft handover implies a data transport at 384 kbit/s, whereas softer handover implies 76 Mbit/s. Compared to the transport capacity required for the softer handover, the newly invented scheme requires a medium transport capacity but offers nearly identical softer handover performance as compared to the extreme case of 76 Mbit/s. Thus, compared to today's case of softer handover at borders between different receiving stations of the same base station by MRC combining of IQ baseband data, a negligible performance loss is faced; compared to today's soft handover between base stations, a significant performance gain is obtained.

In a preferred variant, the combined data stream is generated in the first receiving station by adding up the log-likelihood ratios of the demodulated data streams of each of the receiving stations. In this case, the log-likelihood ratios (LLRs) obtained from the symbols of e.g. a 16-QAM modulation format are combined, the generation of the LLRs for the special case of this modulation format being described in detail in the paper "Exact and Approximated Expressions of the Log-Likelihood ratio for 16-QAM signals" by Steve Allpress, Carlo Luschi, and Steve Felix, in: Signals, Systems, ad Computers 2004, Volume: 1, pp. 794 to 798, the entire contents of which are hereby incorporated by reference. It is understood that LLRs of other modulation formats may be obtained in a comparable way. The combining of log-likelihood ratios is particularly advantageous, as a simple addition of the log-likelihood ratios is sufficient to generate a combined signal which allows to recover a bit stream with increased quality. Depending on the code characteristics, the log-likelihood ratios may be sensed at the output of a demapper which is designed to generate the LLRs or at the output of a (turbo) decoder or a soft bit reduction unit or other entity following the demapper in the signal processing cascade.

In a further preferred variant, in each of the receiving stations, the demodulated data stream is shaped to a demodulated data stream of log-likelihood ratios using a demapper. In this case, the demodulated data streams containing the LLRs are transferred between the receiving stations, thus allowing to combine (add up) the (quantized) LLRs directly in the first receiving station in case that the LLRs of the different receiving stations are scaled with the same scaling factor. In case that different scaling factors are used for the quantization of the LLRs originating from different receiving stations, the respective scaling factors have to be transmitted as well, preferably in a blockwise manner, and can be taken into account when combining the LLRs in the first receiving station. Alternatively, it is also possible to transfer demodulated data streams containing the symbols e.g. of the 16-QAM modulation between the receiving stations, as will be described in further detail below.

In a highly preferred variant, in each receiving station, symbols contained in the demodulated data stream are scaled to a normalized symbol space, preferably in a blockwise manner, the data streams with the scaled symbols being quantized and transferred to the first receiving station together with a signal indicative of the noise variance of the scaled symbols. In this case, the symbols, e.g. of the 16-QAM modulation scheme, are transferred between the receiving stations in a normalized symbol space by pre-scaling the in-phase and quadrature signal components and by pre-computing the offset for a given block of data. These quantities may be re-calculated at pre-defined intervals (e.g. after each block of data), as described in the paper cited above. The normalized (complex) symbols may then be added up in the first receiving station directly to form a combined symbol stream, taking the noise variance which is indicative of the reliability of the transferred symbols into account. The LLRs may then be computed afterwards from the single combined symbol stream. As an alternative, the noise variance which is transferred together with each demodulated data stream may be used to first calculate the LLRs of each of the data streams within the first receiving station, the data streams of log-likelihood ratios of different data streams being added up afterwards in the way described above. Of course, it is also possible to transfer the symbols without blockwise scaling, the scaling being performed in the first receiving station in this case. However, the scaling further reduces the amount of data that has to be exchanged via the backhaul network.

A further aspect of the invention is implemented in a receiving station as described in the introduction, comprising: a demodulator for demodulating the received radio signal to form a demodulated data stream, a combiner for generating a combined data stream by combining the demodulated data stream with at least one further demodulated data stream transferred to the receiving station from the at least one further receiving station, and a hard decision unit for performing a hard decision on the combined data stream for recovering the bit stream. Such a receiving station can be used for implementing the method as described above, either as a first receiving station ("master station") or as one of the further receiving stations ("slave stations"). When being used as a slave station, the receiving station only transfers the demodulated data stream to the master station. As each of the receiving stations may serve as a master or a slave station depending on the circumstances, a plurality of receiving stations of identical construction may be used, in accordance with the concept of a flat network not requiring a central station.

In a preferred embodiment, the receiving station further comprises a demapper for forming a demodulated data stream of log-likelihood ratios from the demodulated data stream, the combiner being designed to generate the combined data stream by adding up the log-likelihood ratios of the demodulated data stream and the log-likelihood ratios of at least one further demodulated data stream from the at least one further receiving station. In this case, the LLRs may be transmitted from the further receiving stations to the first receiving station and may be added up in the combiner which may be located at the output of the demapper or at the output of a decoder or a further entity of the receiving station such as a soft bit reduction unit following the demapper, depending on the characteristics of the (turbo) code used.

In another preferred embodiment, the receiving station further comprises a scaling unit for scaling of symbols contained in the demodulated data stream to a normalized symbol space, preferably in a block-wise manner, the scaling unit being also designed to generate a signal indicative of the noise variance of the scaled symbols. The scaling unit generates a normalized symbol space, thus allowing to reduce the amount of data to be transferred between the different receiving stations. From the symbols in the normalized symbol space and the noise variance, the LLRs can be calculated in the first receiving station serving as a master.

A further aspect of the invention is implemented in a base station router comprising at least one receiving station as described above and a channel element. Usually, base station routers, i.e. base stations which may be connected directly to a core network such as the internet through the channel element, i.e. without using an additional network element such as a radio network controller, offer only one or two RF carriers for diversity reception and a single receiving station (sector). As in the scheme described above, no central channel element is required for the RF receiving heads, the channel element can be integrated within the RF receiving head, thus providing a "wireless line card", by arranging the channel element and the RF receiver on one board, which may be plugged/connected into a (unified) switch or router of the core network.

A further aspect of the invention is implemented in a network for recovering a bit stream from a radio signal transmitted by a mobile station, comprising: a first receiving station as described above for receiving the radio signal, the receiving station preferably being implemented in a first base station router, at least one further receiving station as described above for receiving the radio signal, the at least one further receiving station preferably being implemented in at least one further base station router, and a transfer device, preferably a core network, for transferring the at least one demodulated data stream from the at least one further receiving station to the first receiving station. The network as described above is a flat network, i.e. the base station routers and the receiving stations, respectively, may be of identical construction and no central network element is required. The choice of a particular receiving station which is used as a master station is situation-dependent, and can be made based on specific criteria, e.g. selecting the base station/receiving station as a master station which has first set up the call from the mobile station.

The flat IP network described above has an increased performance as compared to today's hierarchical networks, as the most valuable asset an operator owns is a radio resource, i.e. the licensed spectrum he uses. Therefore, it is the objective of the network operators to squeeze the highest capacity out of their spectrum. The proposed scheme, which has been explained above, exactly meets this requirement.

In a preferred embodiment, the transfer device is designed to transfer a signal indicative of the noise variance of the scaled symbols from the at least one further receiving station to the first receiving station. The signal indicative of the noise variance of the scaled symbols is indicative of the reliability of the symbols, and is used for combining the symbols in the standard symbol space directly by weighting the symbols of different data streams according to their noise variance, thus further improving the quality of the recovered bit stream.

Further characteristics and advantages of the invention are provided in the following description of exemplary embodiments of the invention, with reference to the figures of the drawing, which shows details that are significant in the context of the invention, and in the claims. The individual characteristics can be implemented individually by themselves, or several of them can be implemented in any desired combination in a variant of the invention.

DRAWINGS

Embodiments of the invention are shown in the drawings

Figure 3:
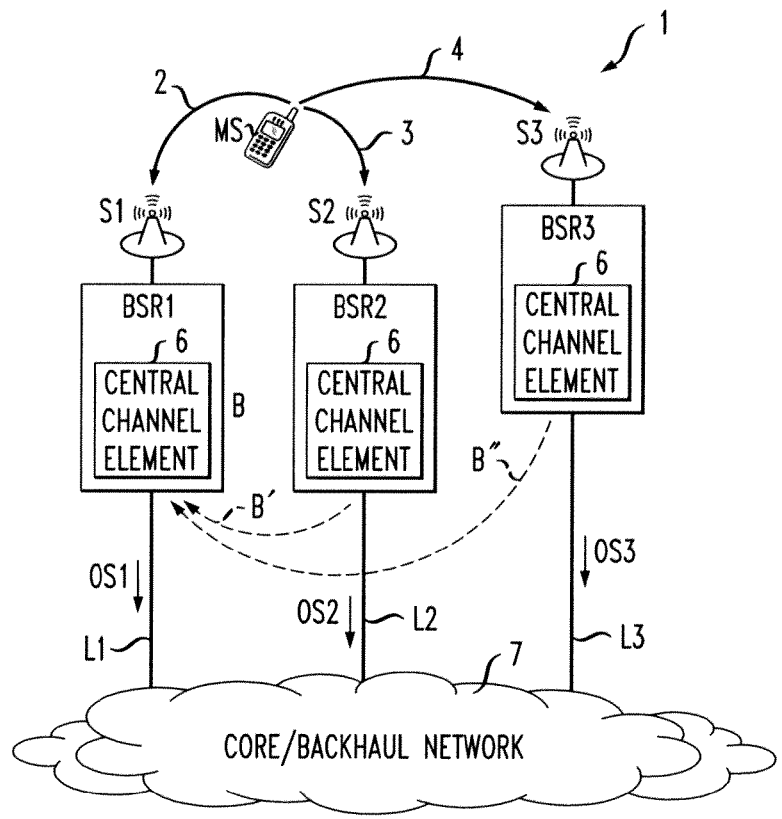
Figure 4:
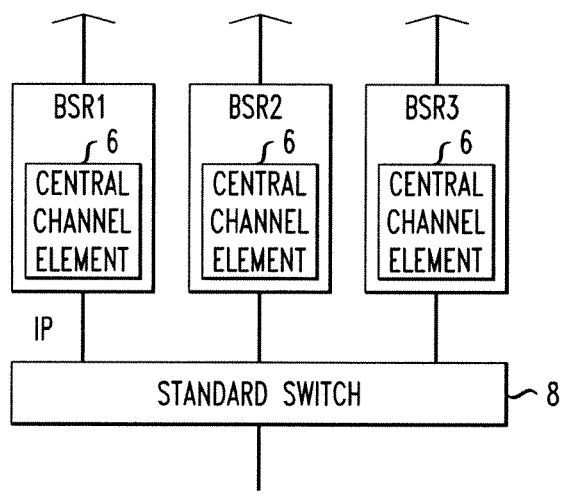
Figure 5:
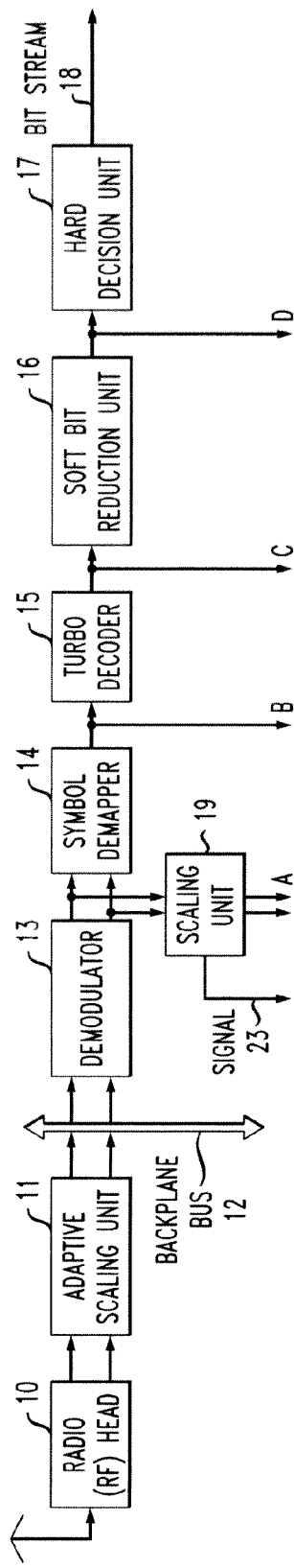
Figure 6:
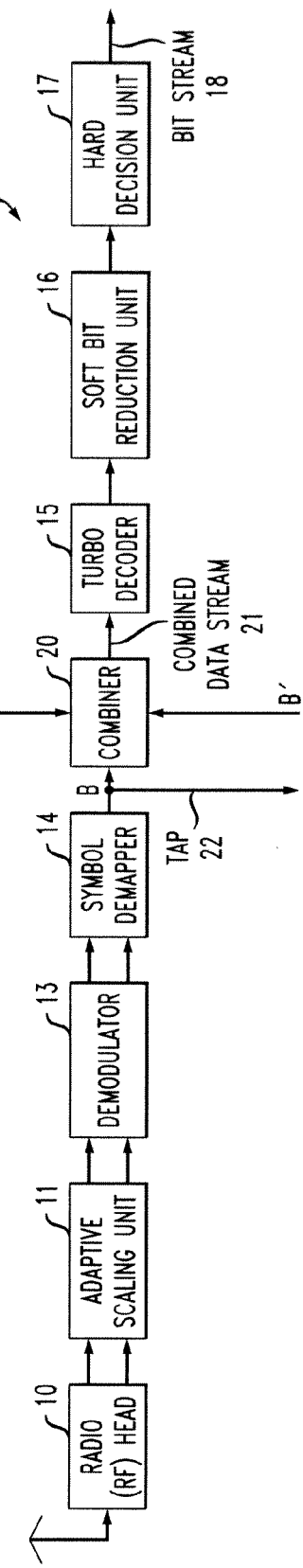

FIG. 1 shows a schematic diagram of a hierarchical network,

FIG. 2 shows a schematic diagram of a base station of the hierarchical network of FIG. 1, FIG. 3 shows an embodiment of a non-hierarchical network according to the invention, FIG. 4 shows embodiments of base station routers according to the invention, FIG. 5 shows an example of a cascade of signal processing with UMTS, and FIG. 6 shows an embodiment of a receiving station according to the invention.

DETAILED DESCRIPTION OF PREFERRED EMBODIMENTS

Throughout the following description, like elements shown the drawings will be referred to with like reference numerals.

FIG. 3 shows a network 1 which differs from the network 1 shown in FIG. 1 in that it is a non-hierarchical network, the base stations BS1 to BS3 of FIG. 1 being replaced by base station routers BSR1 to BSR3, each being connected via a respective link L1 to L3 to the internet which serves as a transfer device in form of a core/backhaul network 7 within the wireless network 1. More precisely, as is also shown in FIG. 4, each of the three base station routers BSR1 to BSR3 comprises its own channel element 6 and thus produces an output signal OS1 to OS3 of standard IP data which is provided to a standard switch 8 located in the core network 7. The base station routers BSR1 to BSR3 each comprise only a single receiving station S1 to S3 which is connected to a mobile station MS located in the coverage area of each of the three base station routers BSR1 to BSR3.

In the flat network 1 of FIG. 3, there is no central station which may be used for combining the output of the base station routers BSR1 to BSR3. In order to recover the bit stream by combining the data streams generated in each base station router BSR1 to BSR3, the first base station router BSR1 is chosen to serve as a master, receiving the data streams from the second and third base station routers BSR2, BSR3 for combining them with its own data stream to recover the bit stream.

The first base station router BSR1 is chosen as the master as it is the one which has set up the call from the mobile station MS. The master may be kept unchanged even if the mobile station MS moves far away and is located closer to another base station router BSR2, BSR3. However, it may be advisable to modify the selection of the master during the call depending on specific criteria, in particular in dependence of the location of the mobile station MS.

In a flat IP network according to the state of the art, the second and third base station routers BSR2, BSR3 send decoded frames as output signals OS2, OS3 towards the first base station router BSR1 in order to keep the load on the IP lines of the core network 7 low. This scheme is called "hairpinning". The frame selection functionality (soft handover), which was originally located at the radio network controller is now located at the first base station router BSR1 serving as a master. Considering a 384 kbit/s service for the user, the hairpinning path only has to carry 384 kbit/s in contrast to 76 Mbit/s on the backplane. The backhaul capacity is therefore reduced by roughly a factor of two hundred when doing soft instead of softer handover in the flat IP network of FIG. 3.

However, base station routers typically offer only one or two RF carriers and a single receiving station (sector). Therefore, even if the three base station routers BSR1 to BSR3 are co-located to create a site with three receiving stations, there is no support for softer handover. At the border between the receiving stations/sectors only soft handover with frame selection can be supported and there is no chance to do softer handover as the base station routers BSR1 to BSR3 do not share a common backplane, nor a communication path for high speed exchange of IQ baseband data, as transporting the IQ baseband data on the core network 7 would overload the latter.

However, there is a significant network performance loss, especially in its capacity, when falling back to soft handover and losing softer handover. Although the transition from a classical hierarchical network as shown in FIG. 1 with base stations and a radio network controller towards base station routers and a flat IP network of FIG. 3 is attractive in terms of costs a d scalability, such a loss in capacity on the wireless air interface is a big drawback. The loss of softer handover support therefore is an obstacle for higher acceptance of base station routers. This has to be seen especially in light that spectrum is costly for operators and therefore spectral efficiency of a wireless network is of ultimate interest for them. It is therefore very problematic that losing softer handover degrades spectral efficiency.

Consequently, also in a flat network 1 as shown in FIG. 3, it is desirable to have a scheme which has a performance comparable to the one offered by a softer handover. Such a scheme will be described in greater detail below for the example of the network 1 using the UMTS standard for which FIG. 5 shows a typical signalling cascade for a 16-QAM HSUPA (high-speed uplink packet access) of 384 kbit/s with ⅓ rate turbo code which may be implemented in the receiving stations S1 to S3 of the base station routers BSR1 to BSR3.

In the signal processing cascade, in a first step, the IQ baseband radio signal is received in a radio (RF) head 10, and two bit streams containing the in-phase and quadrature component of the 16-QAM modulation scheme which is used for the radio transmission are produced. As for UMTS, the IQ baseband data is sampled as 2×14 bit at two samples per chip, the data rate after the RF head 10 is 2×14×2×3.84 MChip/s=215 Mbit/s. The radio cards used for UMTS also comprise an adaptive scaling unit 11 which is used for reducing the resolution from 14 to 5 bit, leading to 76.8 Mbit/s at its output. In a softer handover scheme, the data stream(s) at the output of the adaptive scaling unit 11 are sent to the backplane bus 12 for further treatment, i.e. for using maximum ratio combining before the rest of the cascade shown in FIG. 5 is performed, in particular before the data stream is demodulated.

After the demodulation of the scaled baseband signal in a demodulator 13, the data rate is 2×4 bit×288 kSym/s, as each symbol of the 16-QAM modulation scheme corresponds to four bits, which are extracted from the demodulated data stream in a symbol demapper 14, generating log-likelihood ratios at a data rate of 6 softbits×1.152 Mbit/s=6.9 Mbit/s. The LLRs are provided to the input of a turbo decoder 15 with ⅓ rate, producing an output data stream of 6 softbits×384 kbit/s=2.3 Mbit/s. Following the turbo decoder 15, a soft bit reduction unit 16 is arranged which reduces the resolution of the data stream to 4 softbits×384 kbit/s=1.5 Mbit/s. The reduced number of soft bits is then used to perform a hard decision in a hard decision unit 17 using a maximum-likelihood estimation, thus reproducing a bit stream 18 with the desired rate of 384 kbit/s.

In the UMTS processing cascade of FIG. 5, the data stream at the input of the demodulator 13 which has a data rate of 76.8 Mbit/s is used for the softer handover, whereas the data stream at the output of the hard decision unit 17 with a data rate of 384 kbit/s is used for the soft handover. The scheme which is proposed in the following is based on the transfer of data streams between the receiving stations S1 to S3 which are present at points A to D in the cascade of FIG. 5, i.e. in-between the data streams which are used by the conventional soft and softer handover, respectively.

In case that the demodulated data steams at the input of the decoder 15 (point B) are transferred between the receiving stations S1 to S3, a data rate of 6.9 Mbit/s is required in order to transport the log likelihood ratios (LLRs) at 6 bit resolution. This is already a massive saving by a factor of eleven compared to the data rate of the baseband IQ data used in the softer handover. Compared to the decoded data stream of 384 bit/s that would be transported when using conventional soft handover using frame selection, this is an increase by a factor of eighteen. Therefore, such a proposed scheme is truly in-between the two extremes of soft and softer data transfer of today's networks. Yet, as the performance of softer handover according to the state of the art which is based on IQ baseband data and the softer handover as proposed herein which is based on LLR ratios at the input (point B) of the decoder 15 can be expected to be very similar, there is only a negligible loss in performance, whereas the data transport requirement shrinks from a 100 Mbit/s line to a 10 Mbit/s line on the hairpinning path in the core network 7.

FIG. 6 shows a receiving station S1 of the first base station router BSR1 (master) which corresponds essentially to the cascade shown in FIG. 5, but further comprises a combiner 20 for combining the data stream B at the output of the demapper 14 with respective data streams B', B" which are transferred from the second and third base station routers BSR2, BSR3 to the first base station router BSR1 (see FIG. 4) via the core network 7. The combiner 20 generates a combined data stream 21 at its output, which is produced by adding up the log-likelihood ratios of the different data streams B, B', and B".

As the first receiving station S1 and the corresponding base station router BSR1 may also serve as a slave, the receiving station S1 further comprises a tap 22 for providing the data stream at point B as an output signal OS1 which may be transferred to another base station router serving as a master. In such a way, the base station routers BSR1 to BSR3 and the respective receiving stations S1 to S3 of FIG. 3 may be chosen to be of identical construction.

Depending on the code characteristics, it could also be considered to sense the LLRs at the output of the decoder 15 (point C), or after the soft bit reduction, i.e. with 4-bit resolution (point D). In the latter case, only a data transport requirement of 1.5 Mbit/s is needed, which leads to a saving by more than factor fifty compared to transporting of IQ data in the softer handover according to the state of the art, and this scheme of softer handover comes at a very small data rate increase of factor four compared to a conventional soft handover.

In all the cases described above i.e. when demodulated data streams B, C, D after the demapper 14 are used, these data streams are constituted by LLRs.

As described above, for this type of data, the combination in the first base station router BSR1 is particularly easy, as the data streams B, C, D can be easily combined with data streams from other base station routers in the way described above with respect to the data streams B, B', B".

However, it may also be considered to pass symbol information from the slave stations S2, S3 to the master station S1 as a softer handover information (data stream at point A in FIG. 5). In this case, the received symbols are first normalized to a standard symbol space in a block-wise manner using a scaling unit 19. For the considered example assuming 16-QAM modulation, such a standard symbol space has the constellation plots of the symbols placed at 1/sqrt(10) and 3/sqrt(10) on both the in-phase and the quadrature phase axis. For a series of symbols (a block), a common scaling factor may be used. For each block, the noise variance ($N_0$) may be calculated and also passed as a signal 23 (see FIG. 5) from the "slave" receiving stations S2, S3 to the "master" receiving station S1. The noise variance is an indicator for the reliability of the symbols, which allows to properly compute the LLRs fed into the decoder 15. By normalizing to a standard constellation, a low resolution of four bit in the in-phase and quadrature phase axis may be sufficient, as the noise variance does not change very fast. Due to the coherence time of the channel, the noise variance stays constant for some time and thus it only needs to be transported on the hairpinning path between the base station routers BSR1 to BSR3 in regular time intervals.

In the master station S1, two schemes for processing the symbols may be used: In the first scheme, each data stream of scaled symbols is shaped individually to a data stream of LLRs by using the noise variance of the symbols. In this scheme, the receiving stations have to be provided with a demapper which is capable of demapping the symbol streams from all the receiving stations, preferably in parallel. The resulting log-likelihood ratios at the output of the demapper can then be added up in a combiner following the demapper.

In the second scheme, the combiner is used for adding up the (complex) symbols directly. As the quantization of the symbols of each of the data streams is equal due to the use of the standard symbol space, the noise variance has to be taken into account for adding up the symbols. A high noise variance of the symbols of the data stream of a particular receiving station (e.g. the second receiving station S2) will tell the master receiving station S1 that the symbols are very unreliable, so that it will add up the symbols from the second receiving station S2 using a low probability. However, if noise variance is low, which may be the case for the third receiving station S3, symbols are more reliable and the contribution of the third slave receiving station S3 to the sum should have a higher probability. In the way described above, a combined data signal is obtained which is based on the weighted sum of the data streams from the different receiving stations S1 to S3. The weights are dependent on the noise variance of the symbols, the weights being typically inversely proportional to the noise variance. The data stream containing the combined symbols may then be converted to a data stream of LLRs in a demapper of the master station S1 by taking the noise variance of the combined symbol stream into account.

When comparing the demodulated data stream at point A which comprises data symbols to the decoded data stream at point C which comprises LLRs, the backhaul data transport requirements are comparable (2.3 Mbit/s each), however the information at point A may be more meaningful than at point C, as point C is sensed after the decoder 15 and point A (in symbol space) is located in front of it. With turbo decoders, combining the LLRs at the output of the decoder 15 instead of its input could cause performance losses due to the turbo decoding properties. This performance loss is avoided by sensing the demodulated data signal at point A without facing an increase in hairpinning capacity.

There is one further argument why transfer of the demodulated data stream at point A, i.e. derived from the symbol space is better than transferring the demodulated data stream e.g. at point B, reflecting the LLRs which are provided as an input to the decoder 15. Due to the demapping function and especially as some constellation points have higher momentary power than others, not all bit positions are equally sensitive to interference. This means that inherently some bit positions will have in principle a higher LLRs as compared to others. When quantizing the LLR domain, a high dynamic range and thus a high resolution of the softer information is required. This doesn't apply for the symbol domain where the dynamics can be managed advantageously by blockwise scaling and transmission of the noise variance as described above.

For network design, the schemes described above provide a basis for a trade-off between the loss in network performance by suboptimal softer handover data compared to the ideal case of softer handover based on IQ transport with the massive data transport requirements on the hairpinning path. The loss in stepping down from ideal softer handover (MRC combining of IQ baseband data) to a suboptimal softer handover by passing symbol or LLR information at sector borders, i.e. between different receiving stations, is more than compensated by moving from soft handover to suboptimal softer handover between the sites of the base station routers. In any case, although performance losses should be minimal, any way of providing softer information may perform better than doing soft handover by frame selection.

This is true especially in light that the users at the cell edge which are located half way between the sites of the base station routers are the most "costly" ones for the system given that they are commanded to power up by the system in order to overcome the large distance, By that, they also create massive interference inside of the network 1. Therefore, any kind of network improvement should first focus on those problematic users, and that is exactly what the scheme proposed above does, thus increasing the overall network capacity.

Therefore, the proposed scheme for softer handover between receiving stations, whether they are implemented in the same base station router or in different base station routers, boosts the performance of the wireless network 1 in terms of capacity and quality of service. Softer handover, which was so far only available "microscopically" between sectors of a site, is now also feasible "macroscopically" between sectors of sites widely spaced apart. Through a compression scheme, which extracts the essential "softer" data, the transport of baseband IQ data can be roughly reduced by a factor of forty, thus enabling significant savings in backhaul transport capacity for softer handover.

Moreover, the proposed scheme matches perfectly to the flat IP network philosophy of base station routers and it also eliminates the costly backplane in base stations that is needed for routing of IQ baseband data between sectors. Thus, the invention enables an easy scaling in base station capacity and supports a "pay as you grow" strategy with base station routers, as the number of base station routers is easily increased when capacity demands grow, whereas in a backplane-based approach, the backplane transport capacity would have to match the final size of capacity upgrades.

The scheme also has the potential to become a standard in the context of 3GPP, CPRI or OBSAI as it leads to a new view on the base station architecture. It allows to reuse standard IP equipment instead of using specialized hardware, as can be seen when comparing FIGS. 2 and 4, i.e. the classical architecture definition by CPRI/OBSAI with the one based on the newly proposed scheme. As the CPRI interface (FIG. 2) transports basic IQ data, huge data transport capacity is needed from the RF heads RF1 to RF3 to the switch fabric 5. This is especially problematic if the RF heads RF1 to RF3 are installed remotely and CPRI data has to be transported over larger distances in the context of a base station hotel concept. Furthermore, the switch fabric 5 has to support tremendous data rates similar to the backplane of today's base stations. The concept is also not easily scalable if more and more RF heads are to be added with upgrades. The same problem also applies to the central channel element 6 after the switch fabric 5, as its size has to match the final number of RF heads. Therefore, a "Pay as you grow" strategy is not supported with the CPRI/OBSAI approach.

In contrast to this, as softer data may be transported over the backhaul network in the usual way, i.e. as "classical" IP packages, with the architecture based on the proposed scheme (cf. FIG. 4), standard IP equipment can be used which is very cost-effective and scalability is much easier. Moreover, it is possible to move from a single central channel element 6 to distributed ones, i.e. providing a channel element 6 for each base station router, as shown in FIG. 4. This is closer to the vision of a single one-board base station, as the channel element 6 can be integrated with the radio head RF, thus forming a "wireless line card", where radio and channel element are implemented on the same board and may be plugged into the switch/router 8 of FIG. 4, being e.g. of the MMAP (Multimedia Access Platform) type which is distributed by the applicant. In such a way, a MMAP switch may become a unified switch offering wireline (ATM, SDH, . . . ) and wireless (UMTS, CDMA, . . . ) interfaces within one box and an integrated OAM (Organization, Access and Management) covering both, thus meeting the wishes of the operators for true convergence between wireline and wireless.

The scheme described above is essential for the vision of wireless line cards and thus unified routers, as a backplane for transport of IQ baseband data as in the classical softer HO scheme is not acceptable inside a switch, requiring too much bandwidth and cost. An easy scalability in the number of wireless interfaces may be given, as simply more and more wireless line cards have to be plugged in. Also, these may be wireless line cards operating at different bands or standards, performing an inter-communication based on simple IP, which is already provided inside the switch.

The invention claimed is:

1. Method for recovering a bit stream from a radio signal received in a first receiving station and at least one further receiving station, the method comprising the steps of: in each of the receiving stations,
    demodulating the received radio signal to form a demodulated data stream,
    transferring the at least one demodulated data stream from the at least one further receiving station to the first receiving station, in the first receiving station,
    generating a combined data stream from the demodulated data streams of each of the receiving stations, and
    performing a hard decision on the combined data stream for recovering the bit stream,
    wherein in each receiving station symbols contained in the demodulated data stream are scaled to a normalized symbol space in a blockwise manner, the data streams with the scaled symbols being transferred to the first receiving station, together with a signal indicative of the noise variance of the scaled symbols.

2. Method according to claim 1, wherein the combined data stream is generated in the first receiving station by adding up the log-likelihood ratios of the demodulated data streams of each of the receiving stations.

3. Method according to claim 1, wherein in each of the receiving stations, the demodulated data stream is shaped to a demodulated data stream of log-likelihood ratios using a demapper.

4. Base station router comprising at least one receiving station according to claim 1 and a channel element.

5. A receiving station for recovering a bit stream from a radio signal received in the receiving station and in at least one further receiving station, the receiving station comprising:
    a demodulator for demodulating the received radio signal to form a demodulated data stream,
    a combiner for generating a combined data stream by combining the demodulated data stream with at least one further demodulated data stream transferred to the receiving station from the at least one further receiving station;
    a hard decision unit for performing a hard decision on the combined data stream for recovering the bit stream, and
    a scaling unit for scaling of symbols contained in the demodulated data stream to a normalized symbol space in a block-wise manner, the scaling unit being also designed to generate a signal indicative of the noise variance of the scaled symbols.

6. Receiving station according to claim 5, further comprising a demapper for forming a demodulated data stream of log-likelihood ratios from the demodulated data stream, the combiner being designed to generate the combined data stream by adding up the log-likelihood ratios of the demodulated data stream and the log-likelihood ratios of at least one further demodulated data stream from the at least one further receiving station.

7. A network for recovering a bit stream from a radio signal, comprising:
   a first receiving station according to claim 5 for receiving the radio signal,
   at least one further receiving station according to claim 5 for receiving the radio signal, and
   a transfer device for transferring the at least one demodulated data stream from the at least one further receiving station to the first receiving station, wherein the transfer device is operative to transfer a signal indicative of the noise variance of the scaled symbols from the at least one further receiving station to the first receiving station.

8. The network of claim 7 wherein the at least one further receiving station is implemented in at least one further base station router.

9. The network of claim 7 wherein the transfer device is a core network.

10. The network of claim 7 wherein the receiving station is implemented in a first base station router.

* * * * *